(12) United States Patent
Groten et al.

(10) Patent No.: US 8,682,464 B2
(45) Date of Patent: Mar. 25, 2014

(54) SYSTEM AND METHOD FOR GENERATING A THREE-DIMENSIONAL IMAGE

(75) Inventors: Ludwig Groten, München (DE); Jörg Gerullis, München (DE)

(73) Assignee: Realtime Technology AG, Munich (DE)

( * ) Notice: Subject to any disclaimer, the term of this patent is extended or adjusted under 35 U.S.C. 154(b) by 42 days.

(21) Appl. No.: 13/075,994

(22) Filed: Mar. 30, 2011

(65) Prior Publication Data

US 2012/0254121 A1 Oct. 4, 2012

(51) Int. Cl.
*G06F 19/00* (2011.01)

(52) U.S. Cl.
USPC .......... 700/98; 700/90; 703/1; 707/705; 345/419

(58) Field of Classification Search
None
See application file for complete search history.

(56) References Cited

U.S. PATENT DOCUMENTS

| | | | | |
|---|---|---|---|---|
| 7,596,473 | B2* | 9/2009 | Hansen et al. | 703/1 |
| 8,319,792 | B2* | 11/2012 | Bussey et al. | 345/619 |
| 2002/0120921 | A1* | 8/2002 | Coburn et al. | 717/140 |
| 2003/0233571 | A1* | 12/2003 | Kraus et al. | 713/200 |
| 2004/0128120 | A1* | 7/2004 | Coburn et al. | 703/26 |
| 2005/0278670 | A1* | 12/2005 | Brooks et al. | 716/5 |
| 2006/0136180 | A1* | 6/2006 | Hansen et al. | 703/1 |
| 2006/0212323 | A1* | 9/2006 | Ninomiya | 705/7 |
| 2008/0140357 | A1* | 6/2008 | Bussey et al. | 703/1 |
| 2009/0006223 | A1* | 1/2009 | Liu et al. | 705/29 |
| 2009/0030661 | A1* | 1/2009 | Bouffiou et al. | 703/2 |
| 2009/0063172 | A1* | 3/2009 | Thomas et al. | 705/1 |
| 2009/0281780 | A1* | 11/2009 | Knapp et al. | 703/8 |
| 2009/0300076 | A1* | 12/2009 | Friedman et al. | 707/203 |
| 2011/0098982 | A1* | 4/2011 | Artur et al. | 703/1 |
| 2011/0112982 | A1* | 5/2011 | Srinivasan et al. | 705/348 |
| 2011/0125303 | A1* | 5/2011 | Rollmann et al. | 700/98 |
| 2012/0109592 | A1* | 5/2012 | Potter et al. | 703/1 |
| 2013/0006409 | A1* | 1/2013 | Evans et al. | 700/107 |

OTHER PUBLICATIONS

Autodesk Skill Builders, A Skill-building Exercise, 2003.*

* cited by examiner

*Primary Examiner* — Hung Le
(74) *Attorney, Agent, or Firm* — Amster, Rothstein & Ebenstein LLP

(57) ABSTRACT

A method for generating three-dimensional image data including accessing, using one or more processors, a first set of data from a database, the first set of data relating to an electronic bill of materials of a product, generating, using one or more processors, a second set of data based on the first set of data that relates to a three-dimensional image of the product, enriching, using one or more processors, the second set of data with a third set of data, the third set of data relating to image information added to the three-dimensional image of the product, and storing, using one or more processors, the enriched second set of data in the database.

31 Claims, 5 Drawing Sheets

SYSTEM AND METHOD FOR GENERATING A THREE-DIMENSIONAL IMAGE

TECHNICAL FIELD

The present invention relates to systems and method for generating a three-dimensional image, and in particular to systems and methods for generating a three-dimensional image based on data related to components of a product to be manufactured.

SUMMARY OF THE INVENTION

A method for generating three-dimensional image data according to an exemplary embodiment of the invention comprises: accessing, using one or more processors, a first set of data from a database, the first set of data relating to an electronic bill of materials of a product; generating, using one or more processors, a second set of data based on the first set of data that relates to a three-dimensional image of the product; enriching, using one or more processors, the second set of data with a third set of data, the third set of data relating to image information added to the three-dimensional image of the product; and storing, using one or more processors, the enriched second set of data in the database.

A system for generating three-dimensional image data according to an exemplary embodiment of the invention comprises: one or more data processing apparatus; and a computer-readable medium coupled to the one or more data processing apparatus having instructions stored thereon which, when executed by the one or more data processing apparatus, cause the one or more data processing apparatus to perform a method comprising: accessing a first set of data from a database, the first set of data relating to an electronic bill of materials of a product; generating a second set of data based on the first set of data that relates to a three-dimensional image of the product; enriching the second set of data with a third set of data, the third set of data relating to image information added to the three-dimensional image of the product; and storing the enriched second set of data in the database.

A computer-readable medium according to an exemplary embodiment of the invention comprises instructions stored thereon which, when executed by a data processing apparatus, causes the data processing apparatus to perform a method comprising: accessing a first set of data from a database, the first set of data relating to an electronic bill of materials of a product; generating a second set of data based on the first set of data that relates to a three-dimensional image of the product; enriching the second set of data with a third set of data, the third set of data relating to image information added to the three-dimensional image of the product; and storing the enriched second set of data in the database.

According to an exemplary embodiment of the invention, the database is a product data management system database.

According to an exemplary embodiment of the invention, the first set of data is configured as one or more first database objects arranged in a first hierarchical structure.

According to an exemplary embodiment of the invention, the one or more first database objects comprise one or more original first database objects and one or more first database object revisions corresponding to the one or more original first database objects.

According to an exemplary embodiment of the invention, the second set of data is configured as one or more second database objects arranged in a second hierarchical structure.

According to an exemplary embodiment of the invention, the one or more second database objects comprise one or more original second database objects and one or more second database object revisions corresponding to the one or more original second database objects.

According to an exemplary embodiment of the invention, each of the one or more second database objects is generated as a modified copy of a corresponding one of the one or more first database objects so that the one or more second database objects relate to a three-dimensional image of the product.

According to an exemplary embodiment of the invention, the step of generating a second set of data comprises: detecting changes made to the first set of data; and applying corresponding changes to the second set of data.

According to an exemplary embodiment of the invention, the second data structure is generated such that one or more associations exist between at least one respective first database object and at least one second database object that is generated from the respective first database object. According to an exemplary embodiment of the invention, the step of detecting changes comprises that an association between a first database object and a respective second database object is used to determine from which first database object the respective second database object has been generated and that the determined first database object and the respective second database object are compared with each other. The association may be comprised of a reference from one database object to the other database object.

According to an exemplary embodiment of the invention, the step of detecting changes comprises generating one or more reference objects, each of the one or more reference objects corresponding to and/or having an association with a respective one of the one or more second database objects and referencing a respective one of the one or more first database objects from which the respective one of the one or more second database objects has been generated so that changes made to the one or more first database objects can be detected by comparing at least one of the second database objects with the respective one of the first database objects from which the second database object has been generated.

According to an exemplary embodiment of the invention, the step of detecting comprises: generating a snapshot that represents a state of the first data structure at a point in time at which the second data structure is generated from the first data structure; and comparing a state of the first data structure at a later point in time with the state of the first data structure at the point in time at which the second data structure is generated from the first data structure.

According to an exemplary embodiment of the invention, the snapshot comprises one or more snapshot objects, each of the one or more snapshot objects corresponding with and/or having an association with a respective one of the one or more second database objects and comprising a reference to a respective one of the one or more first database objects from which the respective one of the one or more second database objects was generated.

According to an exemplary embodiment of the invention, each of the one or more snapshot objects comprises a timestamp indicating a state of the respective one of the one or more first database objects at the time the corresponding one of the one or more second database objects was generated from the respective one of the one or more first database objects.

According to an exemplary embodiment of the invention, at least one of the one or more snapshot objects has an association with one or more snapshot node objects, the one or more snapshot node objects comprising a reference to a child object within the first data structure that belongs to the respective one of the one or more first database objects referenced by the snapshot object.

According to an exemplary embodiment of the invention, the step of generating a second set of data comprises at least one of generating one or more second database object revisions, deleting second database objects and adding new second database objects.

According to an exemplary embodiment of the invention, the third set of data comprises data related to one or more of the following: light sources, looks, animations, and surroundings.

These and other features and advantages of the present invention will be presented in more detail in the following detailed description and the accompanying figures which illustrate by way of example principles of the invention.

BRIEF DESCRIPTION OF THE DRAWINGS

Various exemplary embodiments of this invention will be described in detail, with reference to the following figures, wherein.

Figure 1:
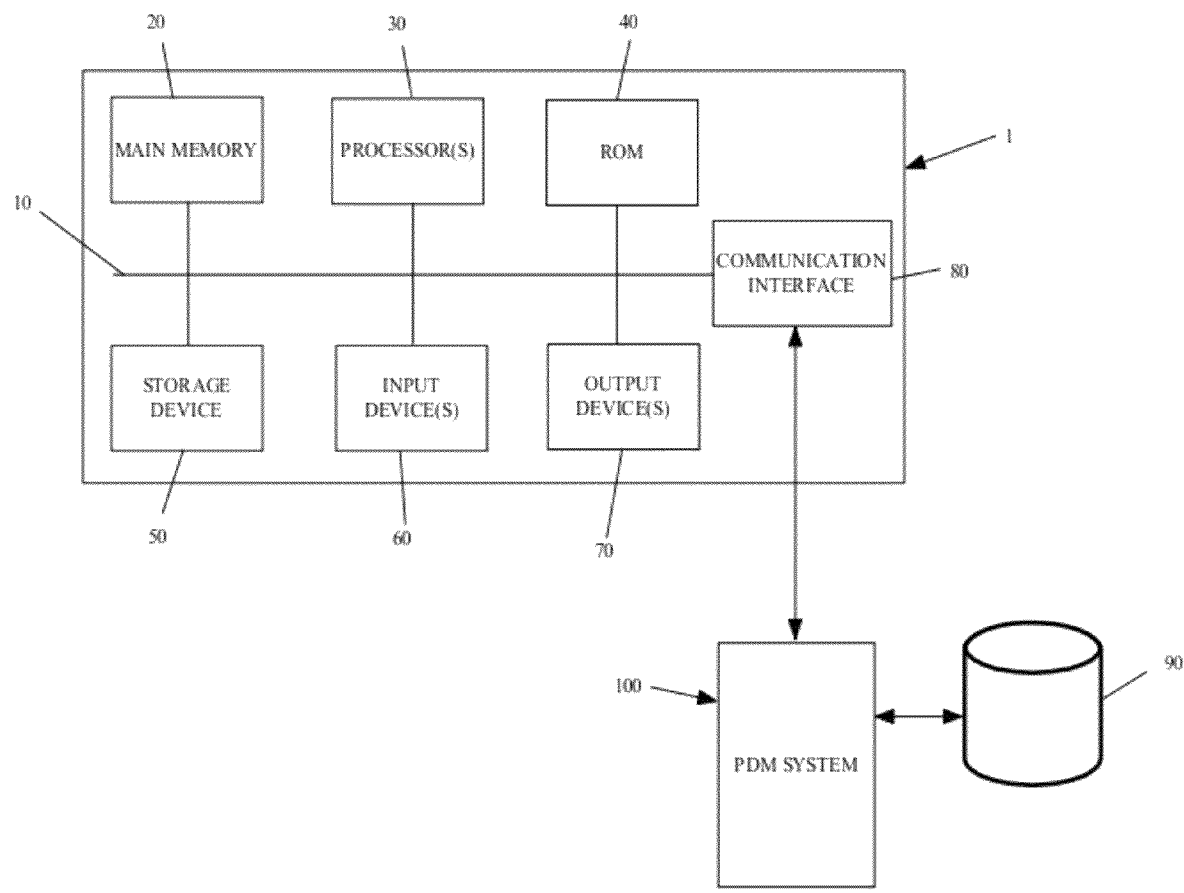
FIG. 1 is a block diagram of a system for generating 3D image data according to an exemplary embodiment of the present invention.

DESCRIPTION OF PREFERRED
EMBODIMENTS OF THE INVENTION

Virtual reality and visualization of products for manufacture is a rather young discipline within companies' product life cycle management. Expert virtual prototype tools, such as, for example, RTT DeltaGen by Realtime Technology AG of Munich, Germany, allows for use of computer-aided design ("CAD") geometry data for the production of life-like virtual representations of objects. Such tools may include functionality such as, for example, ray tracing, global illumination, generation of static/animated scenes, ergonomic analysis, lighting effects and light sources to generate physically realistic three-dimensional ("3D") scenes and models that look photo-realistic and allows for validation of object behavior.

While the visual quality of 3D scenes generated using such virtual prototype tools is quite impressive, the workflow required to create realistic 3D scenes from the CAD data and to keep such data in sync after CAD modification is tedious and error prone. In this regard, a problem exists in the way 3D scenes are built and organized. The underlying data is typically kept in a self-contained file as a result of manual editing or copy entries from a library (e.g., a material from a material library). Once copied into a 3D scene, a component loses the reference to its origin. Later on, changes to the origin are not reflected in any three-dimensional scene that has been generated from the origin. The fact that elements of a 3D scene are copied rather than referenced makes 3D scene management and updating a largely manual exercise.

Complex products typically consist of several thousands of CAD parts and assemblies, most of which are used in more than one product and frequently subject to change. Unlike a typical 3D scene, geometry parts are organized as identifiable components in a database system called an engineering bill of materials ("EBOM"). References to components allow any changes to a component to become directly effective in any product "referencing" the component. Product Data Management ("PDM") Systems organize their data sets in such a way and therefore are capable of managing frequent changes in a consistent manner.

CAD/PLM and 3D scene data are organized in different and incompatible ways, which leads to limitations in automating the update cycles. The CAD world is unaware of additional information required to build a full 3D scene, such as, for example, surroundings, light-setup, sophisticated materials and proper grouping of 3D scene elements to apply animations or variant switches and vice versa.

The present invention is directed to a system and method for generating 3D image data and generating a 3D image based on such data by organizing 3D scene data as a list of references to virtual reality ("VR") components or elements. Thus, such VR components may be managed and maintained as discrete, identifiable components that can be referenced within a 3D scene. In various exemplary embodiments of the invention, database-object-based management employed by PDM systems may also be applied to data that is used for high-quality 3D visualization. In particular, the 3D image data structure generated by the systems and method of the present invention may be similar to an EBOM structure, but include additional data used for high-quality 3D visualization, and thus such data structure may be known as a Virtual Bill of Materials ("VBOM"). Organizing visualization data as a VBOM structure similar to an EBOM structure according to the invention increases flexibility by enabling each object of the VBOM structure to be individually identified and managed, to be re-used within different 3D scenes, to be re-visioned, etc., in the same way as EBOM objects. The VBOM structure may be persisted in the same database as the EBOM structure, so that the same database mechanisms can be applied to both structures and the implementation effort is minimized. Hence, the EBOM structure and the VBOM structure are both maintained in the database at the same time, wherein, according to an embodiment of the invention, the EBOM data structure and the VBOM data structure are accessible by the same database management system and/or are based on the same data model.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database including a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

FIG. 1 is a block diagram of a system for generating 3D image data, generally designated by reference number 1, according to an exemplary embodiment of the present invention. The system 1 may include a bus 10, a main memory 20, one or more processors 30, a read only memory (ROM) 40, a storage device 50, one or more input devices 60, one or more output devices 70, and a communication interface 80. Bus 10 may include one or more conductors that permit communication among the components of the system 1.

Processor 30 may include any type of conventional processor or microprocessor that interprets and executes instructions. Main memory 20 may include a random access memory (RAM) or another type of dynamic storage device that stores information and instructions for execution by processor 30. ROM 40 may include a conventional ROM device or another type of static storage device that stores static information and instructions for use by processor 30. Storage device 50 may include a magnetic and/or optical recording medium and its corresponding drive.

Input devices 60 may include one or more conventional mechanisms that permit a user to input information to system 1, such as a keyboard, a mouse, a pen, one or more biometric mechanisms, such as a voice recognition device, etc. Output devices 70 may include one or more conventional mechanisms that output information to the user, including a display, a printer, a speaker, etc. Communication interface 80 may include any transceiver-like mechanism that enables system 10 to communicate with other devices and/or systems. For example, communication interface 80 may include mechanisms for communicating with another device or system via a network.

As will be described in detail below, system 1, consistent with the principles of the invention, may generate 3D image data based on an electronic bill of materials of a product to be manufactured. System 1 may perform these operations in response to processor 30 executing software instructions contained in a computer-readable medium, such as memory 20. The software instructions may be read into memory 20 from another computer-readable medium, such as data storage device 50, or from another device via communication interface 80. The software instructions contained in memory 20 may cause processor 30 to perform processes that will be described later. Alternatively, hardwired circuitry may be used in place of or in combination with software instructions to implement processes consistent with the principles of the invention. Thus, the invention is not limited to any specific combination of hardware circuitry and software.

The system 1 may also be associated with a database 90 in an implementation consistent with the principles of the invention. While only one database is described, it will be appreciated that system 1 may be associated with one or more additional databases. In an exemplary embodiment of the present invention, the database 90 may be a PDM database that is associated with a PDM system 100 that is in communication with the system 10 via a network or other communication interface. It should be appreciated that the overall structure is not limited to this configuration. For example, the system 1 may be directly integrated with the PDM system 100.

Figure 2:
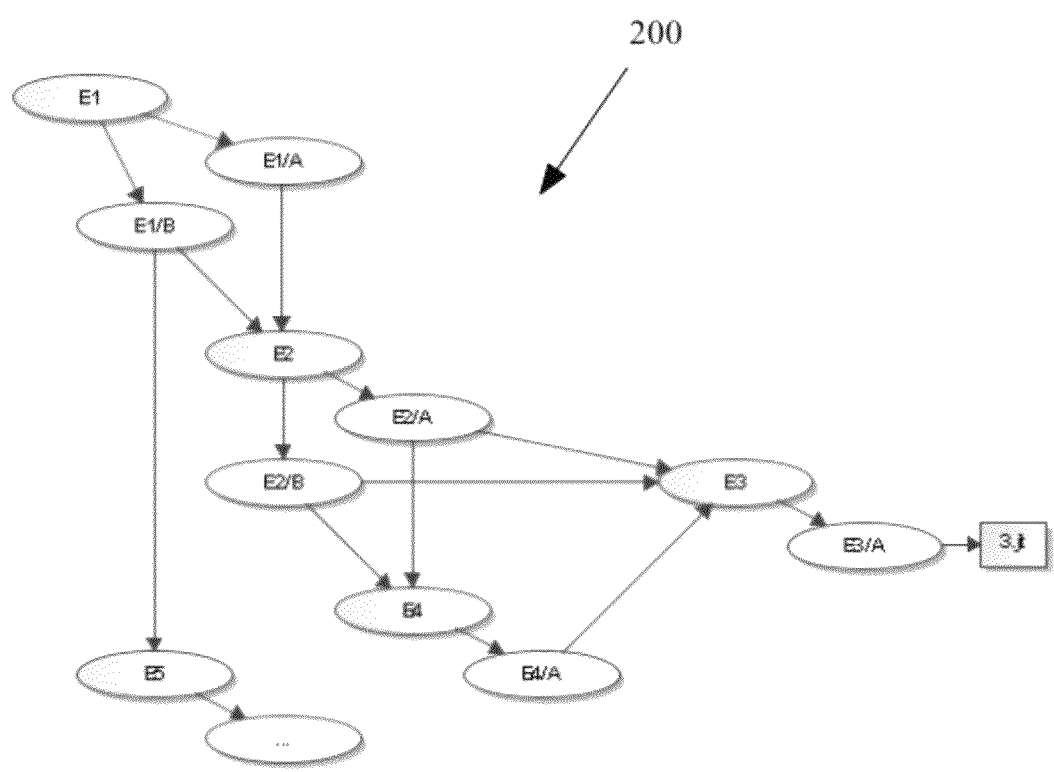
FIG. 2 illustrates a section of a data structure according to an exemplary embodiment of the present invention.

The PDM database may have an EBOM data structure. In this regard, FIG. 2 is an object diagram, generally designated by reference number 200, showing a section of an EBOM of a product. As discussed previously, an EBOM is basically a hierarchy of elements or database objects that represent interrelated components that make up a product, e.g., a car has an engine and a wheel, wherein the engine has a cylinder and the wheel has a vent. An EBOM structure may be implemented in a PDM system as a set of database objects, such as, for example, CAD or JT data objects, which have associations with each other to represent the structure of the actual product. In FIG. 2, database objects E1-E5 related to a JT file dataset "3.jt" and revisions of the objects (e.g., E1/A and E1/B are revisions of the database object E1) are arranged in a tree-diagram to show the associations between the objects and the object revisions. A graphical representation of the EBOM structure such as the one shown in FIG. 2 may be displayed through the one or more output devices 70 as part of a graphical user interface, so that a user can edit the EBOM structure as modifications are made during the manufacturing planning process.

Figure 3:
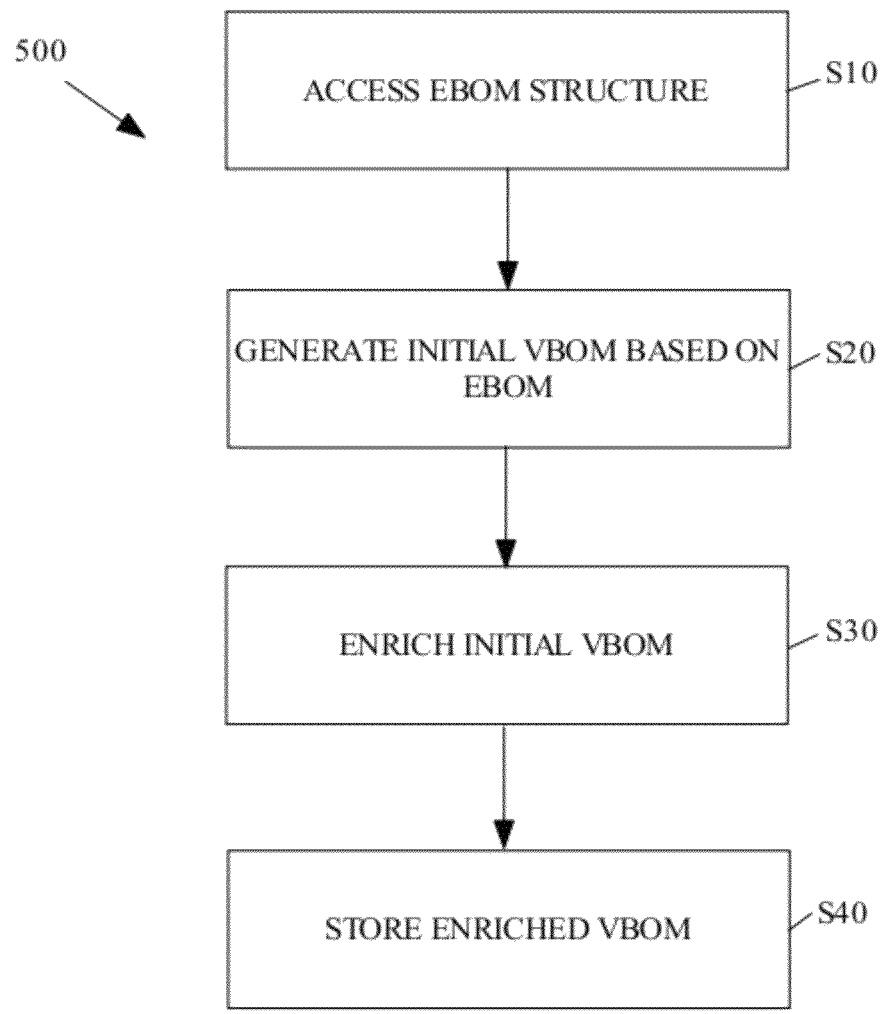
FIG. 3 is a flow chart illustrating a method for generating 3D image data according to an exemplary embodiment of the present invention.
Figure 4:
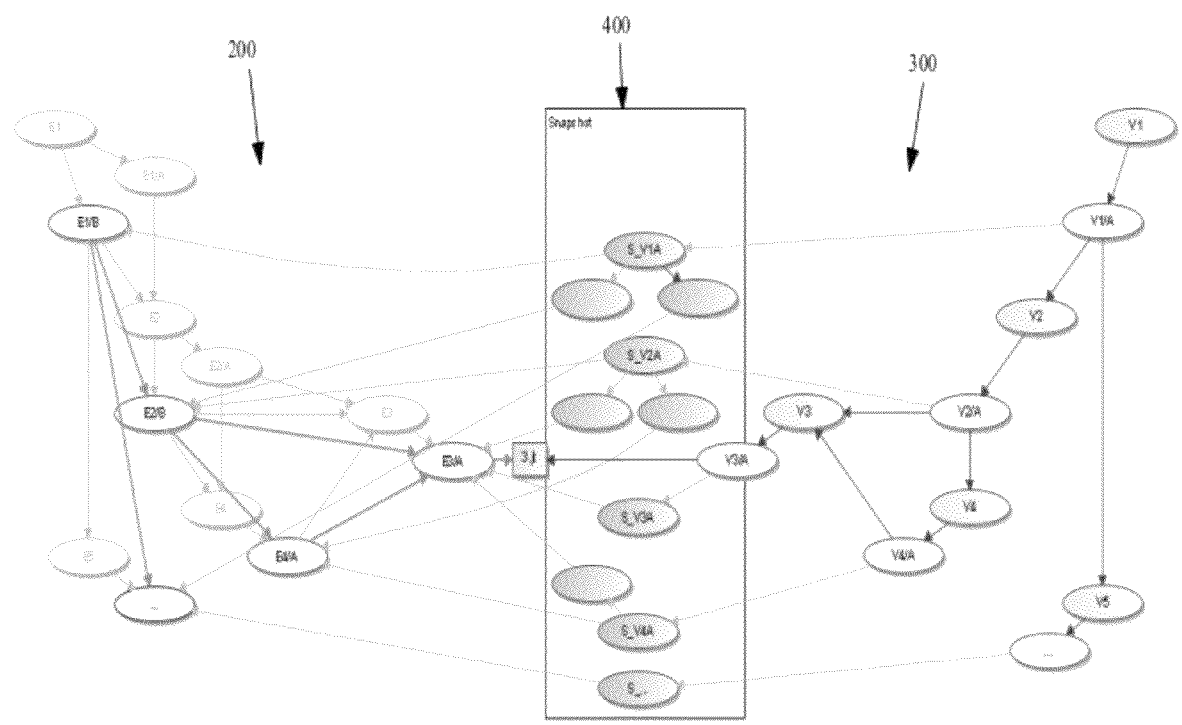
FIG. 4 illustrates a section of a data structure generated based on the data structure in FIG. 2 according to an exemplary embodiment of the present invention.

FIG. 3 is a flow chart showing a method for generating 3D image data according to an exemplary embodiment of the present invention. The process flow shown in FIG. 3 is further illustrated in the tree diagrams shown in FIGS. 4 and 5, which represent data structures that may be generated using the method and systems of the present invention. In step S10 of the process, the system 1 accesses an EBOM data structure in a PDM database. The left side of FIG. 4 shows the EBOM data structure 200, including the most recent revisions of database objects E1/B, E2/B, E3/A and E4/A. As part of step S10, a graphical representation of the EBOM data structure 200 may be displayed, wherein the original database object and prior revisions may be displayed in the EBOM data structure 200 in a different manner as compared to the most recent revisions, such as, for example, by "graying out" the prior revisions in the graphical user interface, so that a user can readily determine the latest object versions.

In step S20 of the process, a second structure of database objects may be generated which is a modified copy of the EBOM structure and which is used for visualization of the product represented by the EBOM structure. As discussed previously, the structure that is generated in this manner is similar to an EBOM structure, but includes additional data used for high-quality 3D visualization and may hence be referred to as a VBOM structure.

The right side of FIG. 4 shows an initial VBOM structure, generally designated by reference number 300, generated from the EBOM structure 200. In this regard, a reference to an EBOM element may be maintained for each VBOM element which has initially been generated from a corresponding EBOM element, wherein the reference indicates the EBOM element from which the VBOM element was initially generated. In an exemplary embodiment, the reference may be in the form of a reference object that is generated for each VBOM element and that references an EBOM element from which the VBOM element was generated. This allows changes in the EBOM structure to be electronically monitored and the related VBOM elements to be electronically updated accordingly. In addition, various exemplary embodiments of the present invention allow the concept of "revisioning" that is known in PDM systems to be implemented within VBOM data structures. In this regard, an EBOM structure and a VBOM structure may each include Item objects (e.g. the EBOM Items E1, E2, E3, E4 and E5 and the VBOM Items V1, V2, V3, V4 and V5 in FIG. 4), where each Item may have several ItemRevisions (e.g. E1/A, E1/B, E2/A, E3/A, E4/A for the EBOM and V1/A, V2/A, V3/A, V4/A for the VBOM shown in FIG. 4). An ItemRevision is a particular version of the Item. Different revisions of an Item may differ in that they may include different 3D geometry information and/or may have associations to different other Item objects or to different CAD or JT data objects.

The updating of the VBOM can be performed automatically or semi-automatically by, for example, the user being presented a dialog indicating differences between the EBOM and VBOM structure and then providing the user with the option to electronically update the VBOM. When it is detected that an EBOM element corresponding to a particular VBOM element has changed, the changes can be applied to the VBOM structure either by adding a new ItemRevision or "Variant" to the respective VBOM element or by overwriting the respective data of the VBOM element. As shown in FIG. 4, database objects V1, V2, V3, V4 and V5 in the VBOM correspond to database objects E1, E2, E3, E4 and E5 in the EBOM, and include corresponding revisions V1/A, V2/A, V3A, V4A, etc.

According to an exemplary embodiment of the present invention, the implementation of step S20 of the process may include a Snapshot function so as to maintain references between the VBOM and the EBOM structures. Each ItemRevision of a VBOM Item may have an associated Snapshot object which carries a reference to the EBOM ItemRevision from which the VBOM ItemRevision was generated. Each Snapshot object has one or more SnapshotNodes, wherein each SnapshotNode carries a reference to an ItemRevision of one of the immediate children of the EBOM Item which is referenced by the Snapshot object. By indicating which child objects were associated with the object referenced by the Snapshot object at the time of the initial generation of the second data structure, the SnapshotNodes allow for determination of not only when an object of the first data structure itself changes, but also when the first data structure changes with respect to its hierarchical structure, such as, for example, when a new object is added at a particular position in the hierarchical structure or an existing object is removed or relocated within the structure. For example, as shown in FIG. 4, a snapshot, generally designated by reference number 400, includes a Snapshot object S_V1A carrying a reference to EBOM object E1/B, which is the latest revision of EBOM Item object E1.

Each Snapshot object and SnapshotNode object may carry a timestamp representing the state of the EBOM object or Item at the time the respective VBOM object or Item was generated from that EBOM object or Item. The Snapshot and SnapshotNodes allow for detection of changes to any EBOM element corresponding to a VBOM element and also for detection of any added or removed EBOM element from the EBOM structure. In this regard, changes in the EBOM and the VBOM may be detected by generating a difference tree that includes nodes, where each node may represent a respective change to the EBOM and/or the VBOM, such as, for example, a new revision in EBOM, a new Item in EBOM, a new revision, a modified CAD part, an Item deleted in the VBOM, and Item deleted in the EBOM.

In step S30 of the process, the generated VBOM structure may be enriched with additional data for visualization, such as, for example, data related to additional light sources, "Looks" of materials, animations, surroundings, etc. In exemplary embodiments, the enrichment data may be in the form of enrichment data objects, such as, for example, Looks objects, Light Source objects, Animation objects and Surrounding objects, to name a few.

A Look object may contain information as to how a portion of a 3D geometry object, such as a CAD-based object, is to be rendered in the final 3D scene. To this end, a Look object may include shader information, texture information, color information and the like and may be associated with an object which contains or is associated with a 3D geometry data set or object such as a CAD, JT or CSB data set and may include information as to which part of the 3D geometry to render in which manner.

A Light Source object may include lighting information that is to be used for the rendering of the 3D scene or a 3-dimensional object therein, e.g. by means of rasterization and/or raytracing. A Light Source object may include a point-like or spot-like light source (Pointlight or Spotlight object) and may be associated with an object that contains or is associated with a 3D geometry data set or object such as a CAD, JT or CSB data set and may for example include information as to which relative position and orientation the light source has with respect to the 3D object represented by the 3D geometry data set.

An Animation object may include information relating to a 3D trajectory along which a 3D object or part of a 3D object is moved during rendering of the 3D scene. The Animation object may include a reference to an object that contains or is associated with a 3D geometry data set to which the respective animation is to be applied.

A Surrounding object may include information relating to a 3D stage on which a 3D geometry object is presented during rendering of the 3D scene and may include 2D image information, such as Tagged Image File Format (TIFF) information.

According to an exemplary embodiment of the invention, when a new revision of a VBOM element such as a VBOM Item is generated, existing enrichment objects, such as a Look object or a Pointlight object, that are referenced by the original revision may also be referenced by the new revision so that the enrichment information is directly reused for the new revision. The references from the new revision to these objects can be generated automatically or semi-automatically, in that a user may be assisted in assigning the existing enrichment objects to the new revision.

Figure 5:
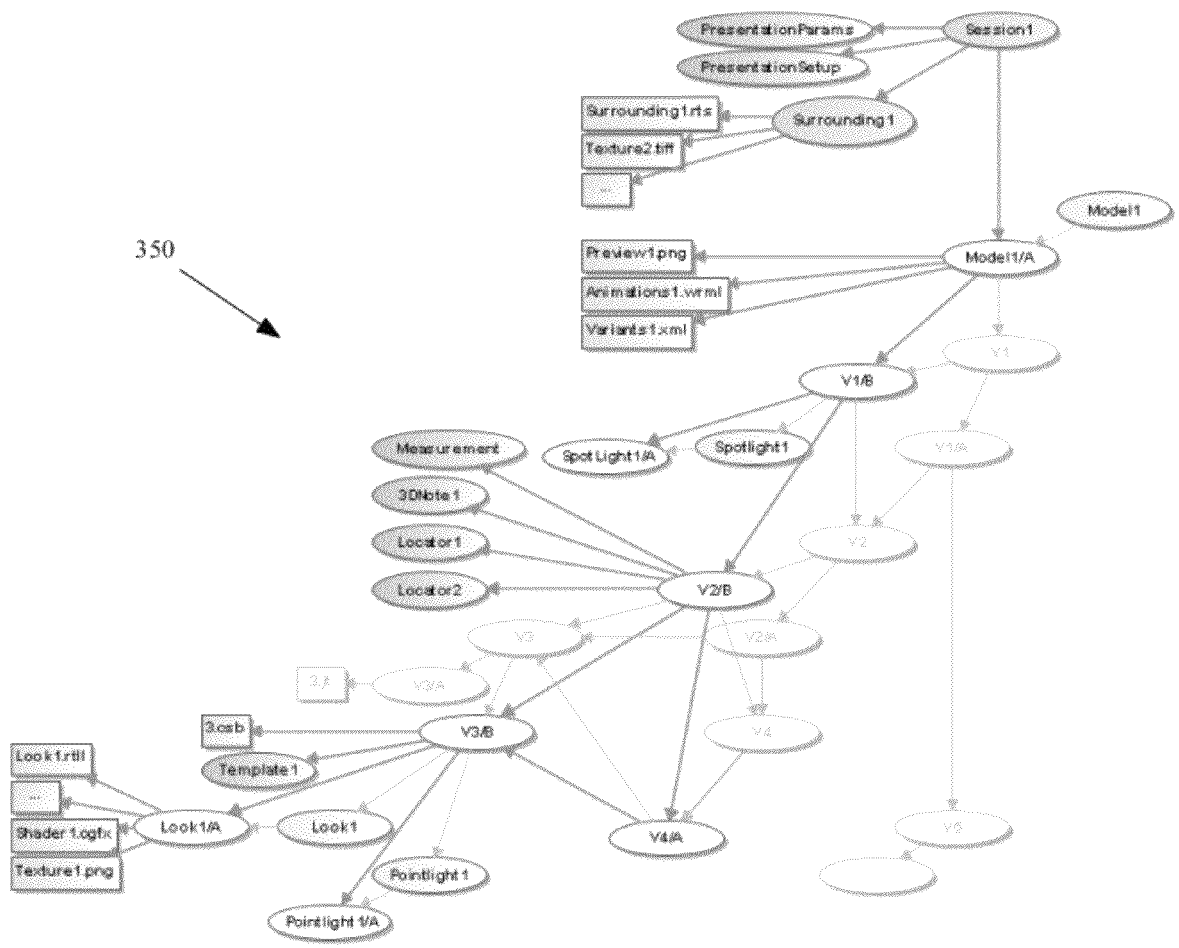
FIG. 5 illustrates the generated data structure of FIG. 4 as enriched with additional image data.

FIG. 5 shows the VBOM data structure 300 after enrichment with visualization enrichment objects, so as to generate an enriched VBOM data structure, generally designated by reference number 350. In the illustrated example, a new object "3.csb" may be generated which includes 3D geometry data relating to the element V3 in the CSB format which is more suitable for 3D visualization than the JT format of the initial "3.jt" object. The new object "3.csb" may be integrated in the VBOM structure without having to modify the EBOM structure, thus making data management less complex. A Model object "Model 1" may also be generated which references the highest object in the hierarchy of the initial VBOM structure, i.e. the parent object "V1" of the initial VBOM structure as generated from the EBOM structure in FIG. 4. An actual 3D scene is represented by a Session object such as "Session 1" which may reference several Model objects. Each of the Session and Model objects may include references to additional enrichment objects required for a rich presentation of the respective model or scene, such as, for example, Surrounding or an Animation. Further enrichment information that relates to elements of the initial VBOM may be contained in further enrichment objects that are referenced by the respective elements of the initial VBOM, such as, for example, Spotlight objects, Pointlight objects, and Look objects.

As mentioned previously, the VBOM structure may include, for each Item, an ItemRevision, and further, each ItemRevision may include several "Variants". In an actual 3D scene, preferably only one version of an Item is displayed, i.e. only one version of the product component that is represented by the particular Item object is present in the final image to be rendered. To this end, the Model object referencing the structure which contains the Item object may include configuration information indicating which revisions of the items included in the VBOM structure referenced by the Model object are to be displayed in the 3D scene.

In step S40 of the process, the system 1 stores the enriched VBOM structure in the same database in which the EBOM structure is stored. Thus, the same database mechanisms may be applied to both the VBOM structure and the EBOM structure, while the separate VBOM structure can be optimized for visualization purposes (e.g., by adding enrichment data to the VBOM data or by modifying the hierarchical structure of the VBOM structure) and the separate EBOM structure can be optimized for use with PDM systems. The enriched VBOM structure may be used to generate a 3D image of the product to be manufactured, where the image includes appropriate image components, such as, for example, animations, backgrounds, and light sources, based on the added visualization data.

According to an aspect of the invention, since the VBOM data structure and the respective EBOM data structure from which the VBOM data structure has been generated are maintained separately and in parallel within the database, the EBOM data structure and the VBOM data structure can be accessed, used, modified and developed further independently of one another, e.g. using different software programs or user visualization-related data contained in the parallel VBOM data structure. Equally, a user may edit enrichment objects of the VBOM data structure or other visualization-related data in the VBOM data structure or a user may modify the hierarchical structure of the VBOM data structure using a visualization software application without having to take care of the parallel EBOM data structure. According to an aspect of the invention, since references and/or snapshots are maintained pointing from the objects of the VBOM data structure to their respective EBOM origin, i.e. the respective objects in the EBOM data structure from which the VBOM objects have been generated, changes in the EBOM data structure can be monitored and automatically or semi-automatically incorporated in the VBOM data structure as desired as part of a respective update mechanism as explained herein. In this manner, the data, in particular the 3D geometry data, contained in the EBOM data structure and in the VBOM data structure can be kept in agreement and in synchronization with one another, while the EBOM data structure and the VBOM data structure can be maintained, accessed, worked on and developed further independently and in parallel to one another.

As used herein, the term database object refers to a distinct set of data that is individually accessed by a database management system. A reference from one database object (e.g. object A) to another database object (e.g. object B) can generally be implemented by the one database object (object A) including or pointing to data that unambiguously identifies the other database object (object B). If it is described herein that one database object (e.g. object A) references another database object (e.g. object B) according to an embodiment of the invention, another more general exemplary embodiment of the invention provides that an association exists between the two database objects, wherein an association between two database objects may for example be a reference from object A to object B or from object B to object A. In any event, an association is adapted to allow a database management system to identify the one database object (e.g. object A) when knowing the other database object (e.g. object B) and/or vice versa.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A method for generating three-dimensional image data relating to a product which is composed of multiple interrelated product components and for rendering a three-dimensional scene including a three-dimensional image of the product, comprising:
   accessing, using one or more processors, a first set of data from a database, the first set of data relating to an electronic bill of materials of the product, wherein the first set of data comprises multiple first database objects contained in said database which each relate to one of the components of the product and which have associations with each other defining a first hierarchical structure in which the first database objects are arranged and which represents the structure of the product;
   generating, using one or more processors, a second set of data based on the first set of data that relates to a three-dimensional image of the product, wherein the second set of data comprises multiple second database objects at least part of which each correspond to a respective first database object and contain or reference three-dimensional geometry data usable for visualizing the component represented by the respective first database object in the three-dimensional image of the product, wherein the second database objects have associations with each other defining a second hierarchical structure in which the second database objects are arranged and which represents the structure of the three-dimensional scene;
   enriching, using one or more processors, the second set of data with a third set of data, wherein the third set of data comprises multiple third database objects which have associations with the second database objects and wherein the third database objects contain image information added to the three-dimensional image of the product;
   persistently storing, using one or more processors, the enriched second set of data in said database; and
   rendering, using one or more processors, a three-dimensional scene including a three-dimensional image of the product on the basis of the stored enriched second set of data using the three-dimensional geometry data contained in or referenced by the second database objects, the associations between the second database objects with each other and with the third database objects and the image information of the third database objects.

2. The method of claim 1, wherein the database is a product data management system database.

3. The method of claim 1, wherein the one or more first database objects comprise one or more original first database objects and one or more first database object revisions corresponding to the one or more original first database objects.

4. The method of claim 1, wherein the one or more second database objects comprise one or more original second database objects and one or more second database object revisions corresponding to the one or more original second database objects.

5. The method of claim 1, wherein each of the one or more second database objects is generated as a modified copy of a corresponding one of the one or more first database objects so that the one or more second database objects relate to a three-dimensional image of the product.

6. The method of claim 1,
   wherein snapshot is generated that represents a state of the first data structure at a point in time at which the second data structure is generated from the first data structure, and the method further comprises:
   detecting changes made to the first set of data; and
   applying corresponding changes to the second set of data, wherein the step of detecting changes comprises comparing a state of the first data structure at a later point in time with the state of the first data structure at the point in time at which the second data structure is generated from the first data structure.

7. The method of claim 6, wherein the snapshot comprises one or more snapshot objects, each of the one or more snapshot objects associated with a respective one of the one or more second database objects and comprising a reference to a respective one of the one or more first database objects from which the respective one of the one or more second database objects was generated.

8. The method of claim 7, wherein each of the one or more snapshot objects comprises a timestamp indicating a state of the respective one of the one or more first database objects at the time the corresponding one of the one or more second database objects was generated from the respective one of the one or more first database objects.

9. The method of claim 7, wherein each of the one or more snapshot objects has an association with one or more snapshot node objects, the one or more snapshot node objects comprising a reference to a child object within the first data structure that belongs to the respective one of the one or more first database objects referenced by the snapshot object.

10. The method of claim 1, wherein the third set of data comprises data related to one or more of the following: light sources, shader information, texture information, animations, and surroundings.

11. The method of claim 1, wherein the second set of data is generated such that an association exists between at least one first database object and at least one second database object that corresponds to the first database object, and wherein the method comprises:
   detecting changes made to the first set of data; and
   applying corresponding changes to the second set of data, wherein the step of detecting changes comprises that the association between the first database object and the second database object is used to determine the first database object and the second database object which correspond to each other and that the determined first and second database object are compared to each other.

12. The method of claim 11, wherein one or more reference objects are generated, each of the one or more reference objects corresponding to a respective one of the one or more second database objects and referencing a respective one of the one or more first database objects from which the respective one of the one or more second database objects has been generated, and wherein the changes made to the one or more first database objects are detected by comparing at least one of the second database objects with a respective one of the first database objects from which the second database object has been generated.

13. The method of claim 1, wherein the first, second and third database objects are each configured to be individually accessed by a database management system and wherein the associations between the first, second and third database objects are adapted to enable the database management system to identify a database object when knowing the associated database object.

14. The method of claim 1, wherein the third set of data comprises one or more of the following:
- a Light Source database object including lighting information used for rendering the three-dimensional scene or a three-dimensional object therein by rasterization and/or ray tracing,
- a Look database object which is associated with one of the second database objects and which includes shader and/or texture information used to render a three-dimensional object in the three-dimensional scene that is represented by the respective second database object, and
- an Animation database object which is associated with one of the second database objects and which includes information relating to a three-dimensional trajectory along which a three-dimensional object represented by the respective second database object is moved in the three-dimensional scene.

15. The method of claim 1, wherein the third set of data comprises a Surrounding database object which includes information relating to a three-dimensional stage on which a three-dimensional object is presented in the three-dimensional scene.

16. A system for generating three-dimensional image data relating to a product which is composed of multiple interrelated components and for rendering a three-dimensional scene including a three-dimensional image of the product, comprising:
- one or more data processing apparatus; and
- a computer-readable medium coupled to the one or more data processing apparatus having instructions stored thereon which, when executed by the one or more data processing apparatus, cause the one or more data processing apparatus to perform a method comprising:
    - accessing a first set of data from a database, the first set of data relating to an electronic bill of materials of the product, wherein the first set of data comprises multiple first database objects contained in said database which each relate to one of the components of the product and which have associations with each other defining a first hierarchical structure in which the first database objects are arranged and which represents the structure of the product;
    - generating a second set of data based on the first set of data that relates to a three-dimensional image of the product, wherein the second set of data comprises multiple second database objects at least part of which each correspond to a respective first database object and which contain or reference three-dimensional geometry data usable for visualizing the component represented by the respective first database object in the three-dimensional image of the product, wherein the second database objects have associations with each other defining a second hierarchical structure in which the second database objects are arranged and which represents the structure of the three-dimensional scene;
    - enriching the second set of data with a third set of data, the third set of data, wherein the third set of data comprises multiple third database objects which have associations with the second database objects and wherein the third database objects contain image information added to the three-dimensional image of the product;
    - persistently storing the enriched second set of data in said database; and
    - rendering a three-dimensional scene including a three-dimensional image of the product on the basis of the stored enriched second set of data using the three-dimensional geometry data contained in or referenced by the second database objects, using the three-dimensional geometry data contained in or referenced by the second database objects, the associations between the second database objects with each other and with the third database objects and the image information of the third database objects.

17. The system of claim 16, wherein the database is a product data management system database.

18. The system of claim 16, wherein the one or more first database objects comprise one or more original first database objects and one or more first database object revisions corresponding to the one or more original first database objects.

19. The system of claim 16, wherein the one or more second database objects comprise one or more original second database objects and one or more second database object revisions corresponding to the one or more original second database objects.

20. The system of claim 16, wherein each of the one or more second database objects is generated as a modified copy of a corresponding one of the one or more first database objects so that the one or more second database objects relate to a three-dimensional image of the product.

21. The system of claim 16,
wherein a snapshot is generated that represents a state of the first data structure at a point in time at which the second data structure is generated from the first data structure, and the method further comprises:
detecting changes made to the first set of data; and
applying corresponding changes to the second set of data, wherein the step of detecting comprises comparing a state of the first data structure at a later point in time with the state of the first data structure at the point in time at which the second data structure is generated from the first data structure.

22. The system of claim 21, wherein the snapshot comprises one or more snapshot objects, each of the one or more snapshot objects corresponding with a respective one of the one or more second database objects and comprising a reference to a respective one of the one or more first database objects from which the respective one of the one or more second database objects was generated.

23. The system of claim 22, wherein each of the one or more snapshot objects comprises a timestamp indicating a state of the respective one of the one or more first database objects at the time the corresponding one of the one or more second database objects was generated from the respective one of the one or more first database objects.

24. The system of claim 22, wherein each of the one or more snapshot objects has an association with one or more snapshot node objects, the one or more snapshot node objects comprising a reference to a child object within the first data structure that belongs to the respective one of the one or more first database objects referenced by the snapshot object.

25. The system of claim 16, wherein the third set of data comprises data related to one or more of the following: light sources, shader information, texture information, animations, and surroundings.

26. The system of claim 16, wherein the second set of data is generated such that an association exists between at least one first database object and at least one second database object that corresponds to the first database object, and wherein the method comprises:
- detecting changes made to the first set of data; and
- applying corresponding changes to the second set of data, wherein the step of detecting changes comprises that the association between the first database object and the second database object is used to determine the first database object and the second database object which correspond to each other and that the determined first and second database object are compared to each other.

27. The system of claim 26, wherein one or more reference objects are generated, each of the one or more reference objects corresponding to a respective one of the one or more second database objects and referencing a respective one of the one or more first database objects from which the respective one of the one or more second database objects has been generated and wherein the changes made to the one or more first database objects are detected by comparing at least one of the second database objects with the respective one of the first database objects from which the second database object has been generated.

28. The system of claim 16, wherein the first, second and third database objects are each configured to be individually accessed by a database management system and wherein the associations between the first, second and third database objects are adapted to enable the database management system to identify a database object when knowing the associated database object.

29. The system of claim 16, wherein the third set of data comprises one or more of the following:
- a Light Source database object including lighting information used for rendering the three-dimensional scene or a three-dimensional object therein by rasterization and/or ray tracing,
- a Look database object which is associated with one of the second database objects and which includes shader and/or texture information used to render a three-dimensional object in the three-dimensional scene that is represented by the respective second database object, and
- an Animation database object which is associated with one of the second database objects and which includes information relating to a three-dimensional trajectory along which a three-dimensional object represented by the respective second database object is moved in the three-dimensional scene.

30. The system of claim 16, wherein the third set of data comprises a Surrounding database object which includes information relating to a three-dimensional stage on which a three-dimensional object is presented in the three-dimensional scene.

31. A non-transitory computer-readable medium comprising instructions stored thereon which, when executed by a data processing apparatus, causes the data processing apparatus to perform a method for generating three-dimensional image data relating to a product which is composed of multiple interrelated product components and for rendering a three-dimensional scene including a three-dimensional image of the product, comprising:
- accessing a first set of data from a database, the first set of data relating to an electronic bill of materials of the product, wherein the first set of data comprises multiple first database objects contained in said database which each relate to one of the components of the product and which have associations with each other defining a first hierarchical structure in which the first database objects are arranged and which represents the structure of the product;
- generating a second set of data based on the first set of data that relates to a three-dimensional image of the product, wherein the second set of data comprises multiple second database objects at least part of which each correspond to a respective first database object and contain or reference three-dimensional geometry data usable for visualizing the component represented by the respective first database object in the three-dimensional image of the product, wherein the second database objects have associations with each other defining a second hierarchical structure in which the second database objects are arranged and which represents the structure of the three-dimensional scene;
- enriching the second set of data with a third set of data, wherein the third set of data comprises multiple third database objects which have associations with the second database objects and wherein the third database objects contain image information added to the three-dimensional image of the product;
- persistently storing the enriched second set of data in said database; and
- rendering a three-dimensional scene including a three-dimensional image of the product on the basis of the stored enriched second set of data using the three-dimensional geometry data contained in or referenced by the second database objects, the associations between the second database objects with each other and with the third database objects and the image information of the third database objects.

* * * * *